US011222155B1

(12) United States Patent
Tehrani et al.

(10) Patent No.: US 11,222,155 B1
(45) Date of Patent: Jan. 11, 2022

(54) METHOD AND APPARATUS FOR REDUCING PESSIMISM OF GRAPH BASED STATIC TIMING ANALYSIS

(71) Applicant: Synopsys, Inc., Mountain View, CA (US)

(72) Inventors: Peivand Tehrani, Mountain View, CA (US); Rachid Helaihel, Mountain View, CA (US); Hushrav Mogal, Mountain View, CA (US); Song Chen, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/021,938

(22) Filed: Sep. 15, 2020

Related U.S. Application Data

(60) Provisional application No. 63/009,180, filed on Apr. 13, 2020.

(51) Int. Cl.
| | | |
|---|---|---|
| *G06F 30/30* | (2020.01) | |
| *G06F 30/3312* | (2020.01) | |
| *G06F 30/337* | (2020.01) | |
| *G06F 30/3315* | (2020.01) | |
| *G06F 119/12* | (2020.01) | |

(52) U.S. Cl.
CPC ........ *G06F 30/3312* (2020.01); *G06F 30/337* (2020.01); *G06F 30/3315* (2020.01); *G06F 2119/12* (2020.01)

(58) Field of Classification Search
CPC ............. G06F 30/3312; G06F 30/3315; G06F 30/337; G06F 2119/12
See application file for complete search history.

(56) References Cited

U.S. PATENT DOCUMENTS

| | | | | |
|---|---|---|---|---|
| 8,775,989 | B2 * | 7/2014 | Gangadharan | ...... G06F 30/3312 716/108 |
| 8,839,167 | B1 * | 9/2014 | Dreibelbis | .......... G06F 30/3312 716/108 |
| 9,026,965 | B2 * | 5/2015 | Mogal | ................... G06F 30/398 716/108 |
| 10,002,225 | B2 * | 6/2018 | Wrixon | ................. G06F 30/367 |
| 10,169,501 | B1 * | 1/2019 | Kulshreshtha | ...... G06F 30/3312 |
| 10,223,493 | B1 * | 3/2019 | Spyrou | ............... G06F 30/3312 |
| 10,740,520 | B2 * | 8/2020 | Feng | ................ G01R 31/31725 |
| 10,776,547 | B1 * | 9/2020 | Gupta | ................. G06F 16/9024 |

* cited by examiner

*Primary Examiner* — Leigh M Garbowski
(74) *Attorney, Agent, or Firm* — Jaquez Land Greenhaus & McFarland LLP; Bruce W. Greenhaus, Esq.

(57) ABSTRACT

Disclosed is a method and apparatus that takes timing information associated with a plurality of inputs to a cell, such as an AND-gate, within an integrated circuit (IC) design, store the timing information in a timing information register (TIR) associated with an index identifying the source of the timing information and track the source of the timing information for a predetermined number of cells through the index. The timing information in the TIRs is merged upon the index indicating that the timing information has been tracked through a predetermined number of cells.

24 Claims, 10 Drawing Sheets

METHOD AND APPARATUS FOR REDUCING PESSIMISM OF GRAPH BASED STATIC TIMING ANALYSIS

CROSS-REFERENCE TO RELATED APPLICATION—CLAIM OF PRIORITY

This application claims the benefit of priority to provisional Application No. 63/009,180 filed Apr. 13, 2020, entitled "Method and Apparatus for Reducing Pessimism of Graph Based Static Timing Analysis", the disclosure of which is incorporated herein by reference in its entirety.

TECHNICAL FIELD

The present disclosure relates to systems and methods for verifying timing of an integrated circuit design, and more particularly, to a method and apparatus for reducing pessimism of graph based static timing analysis.

BACKGROUND

Designing complex integrated circuits is difficult due to the large number of circuit paths and circuit components throughout the design. The demand for use of such complex integrated circuits continues to grow. Many tools may assist in the design of such circuits, including tools that are used to ensure that such designs meet reliability and operational requirements. One important reliability and operational requirement is the requirement imposed on the timing of signals through each of the large number of paths present in such circuits. Tools for ensuring that the timing requirements for the circuit are met typically estimate a slack in each of the paths through the circuit. A slack refers to a difference between a maximum allowable delay and a determined maximum delay. Accordingly, slack is considered to be positive when a signal propagates faster than required. In contrast, slack is considered to be negative when a signal propagates slower than required.

One way to determine the timing and thus determine the slack associated with the integrated circuit design is called static timing analysis (STA). STA provides a means for analyzing the timing of the circuits within the design without regard to the particular states of signals applied to the circuits. STA provides a reasonable estimate for determining whether a design meets its timing requirements. During dynamic timing analysis (DTA), a more accurate determination can be made as to whether a design meets its timing requirements based on applying each input to the circuit (or simulated) in every possible combination. However, the amount of time and resources required to perform DTA on complex designs makes it impractical to implement. That is, due to the relatively large number of input signals and potential states of these input signals, the time and memory required to simulate all such cases makes implementing such a simulation too difficult. Therefore, using STA is a well-recognized alternative.

Two types of STA include path based static timing analysis (PBA) and graph based static timing analysis (GBA). In GBA, endpoint timing slacks of the design are computed in a conservative manner Since GBA is conservative, it is typically also relatively fast.

SUMMARY

A method is disclosed which comprises receiving timing information associated with signals applied to at least one input to cells within an integrated circuit (IC) design Timing information at the output of the cells is based on the timing characteristics of the cells and the timing information that is applied to the cell. The timing information is then stored in an element of a timing information vector (TIV). An index is provided that is linked to the TIV that identifies a path through a predetermined number of cells of the IC design traversed by the timing information. At points throughout the design, timing information within a plurality of the elements of a TIV are merged upon the index indicating that the timing information within the plurality of elements has traversed a predetermined number of cells.

Also disclosed is a system comprising a plurality of timing information registers (TIRs) having elements for storing timing information, each TIR associated with the output of a cell within an integrated circuit design. A plurality of index registers are provided that are linked with an element of the plurality of TIRs and that identify an input of the cell and associated timing information. A processor is coupled with the TIRs to receive timing information. Each TIR is associated with one of the inputs to a cell within an integrated circuit (IC) design. The timing information is stored in the element of the TIR linked with the index register identifying the input with which the timing is associated. The source of the timing information is tracked for a predetermined number of cells using the index register. The timing information stored in the elements of a TIR is then merged upon the index linked with the elements indicating that the timing information has been tracked through a predetermined number of cells.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
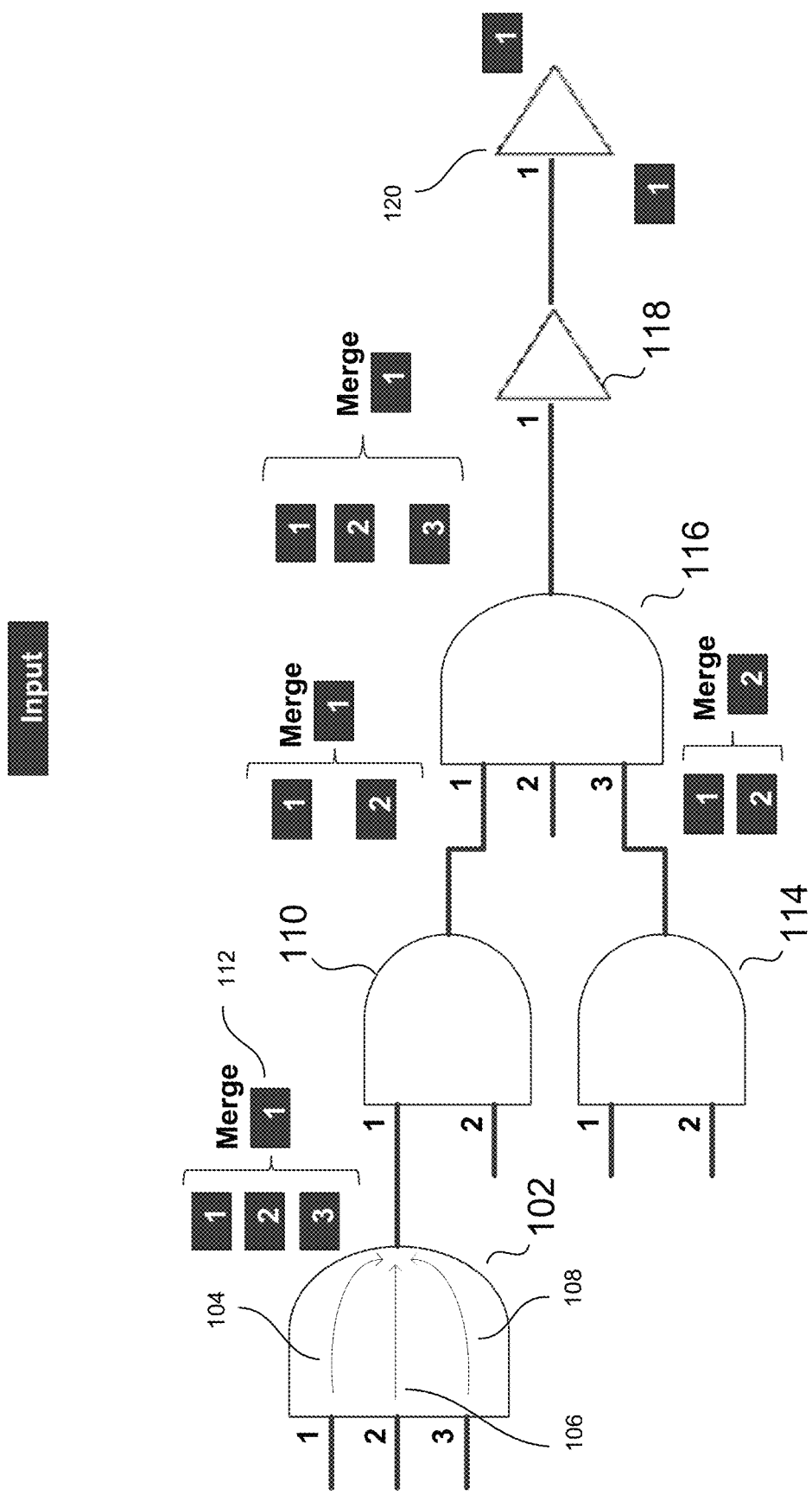
FIG. 1 illustrates a portion of an IC design that may be analyzed using a GBA static timing analysis technique, according to one embodiment.

A hybrid approach is used in which PBA and GBA are used together. GBA is first used to get a rough estimate of the timing parameters of the design (i.e., timing slack for paths through the design). PBA is then used to refine the timing slack values by exhaustively going through selected paths identified by the values attained through the GBA process. However, such a hybrid approach has problems. One problem occurs when the analysis determines that changes to the design are required. Such changes make the GBA analysis invalid, requiring that the entire hybrid process analysis be repeated for each change that is made, in order to validate that the desired outcome has been achieved.

In addition, demand for low power consumption has reduced the chip operating voltages, which has in turn caused significant increases in analog effects as well as process related timing variations. These effects have resulted in an increase in the gap between the timing and power required to perform PBA verses GBA. This increased gap leaves a significant amount of work to be performed during the slower PBA operation to complete a timing and power optimization. The result is an increase in the amount of time and resources required to complete the process of designing a complex integrated circuit chip.

A system is disclosed that can: (1) more accurately determine whether a very large scale integrated circuit (VLSI) chip having millions of local random variables will meet timing requirements; (2) model the design using less memory, running to completion in less time; and (3) be tolerant of changes in the design, such that the analysis need not be repeated upon changes being made to the design.

The disclosed method and apparatus perform a modified version of graph based analysis (GBA) that is more accurate than GBA and so reduces the amount of effort required by a supplemental path based analysis (PBA) routine. The modified version of the GBA is referred to herein as advanced GBA (A-GBA). A-GBA can be operated in a manner that allows the operator to selectively adjust the accuracy of the analysis at the expense of an increase in the runtime and the amount of memory required. A-GBA is fully compatible with all the desired and familiar reporting styles commonly associated with GBA. For example, A-GBA can correctly and accurately report timing on any (critical or sub-critical) paths, regardless of the endpoint slack values of the particular path. In addition, A-GBA can provide conservative and accurate pin slack values (a capability for timing and power optimization engineering change order (ECO) flows).

Challenges exist in identifying a solution due to the relatively large runtime and memory requirements of several proposed solutions. In some cases, an external memory can be used to offload some of the memory requirements to an external device or system. Nonetheless, ensuring that these large requirements are manageable requires reducing the accuracy, thus increasing the margin that must be applied in the analysis performed (e.g., increasing a negative slack area). This results in a reduction in the effectiveness of the solution, especially when attempting to optimize power consumption within the design. Moreover, typical solutions may not fit well within the STA framework, specifically incremental timing analysis flow which is the foundation of timing and power optimization.

FIG. 1 illustrates a portion of an IC design that may be analyzed using a GBA static timing analysis technique, according to one embodiment. In accordance with one particular GBA algorithm, a first cell of the design (e.g., a logic-gate, such as a three-input AND-gate 102, an OR-gate, a NAND-gate, a NOR-gate, an XOR-gate, an AND-OR-invert (AOI) cell, and an invert-OR-AND (IOA) cell) has three signal inputs labeled "1", "2" and "3", respectively. A cell may refer to a block of circuitry associated with a function. An arc may refer to the effects imposed on a signal from an input to an output of a cell. Accordingly, there are three distinct arcs 104, 106, 108, each associated with a respective input "1", "2", and "3" to the AND-gate 102. In practice, there might be more than one arc between each input and output as well.

The output of the AND-gate 102 is coupled to a second cell (e.g., a two-input AND-gate 110). In particular, the output of the AND-gate 102 is coupled to a first input, labeled "1" of the AND-gate 110. The signal coupled to each input of the AND-gate 102 may include different types of timing information. In addition, the timing information may differ for different signals applied to the same input, since the source and the load associated with each signal may be different. The timing information may refer to timing parameters that can be tracked through an IC design. The types of timing information include, but are not limited to a delay, a delta delay, a slew (e.g., a rise time, a fall time), a waveform, an effective capacitance, a worst arc index, and an internal data structure (i.e., data representing a group of related timing parameters, such as one or more of the above noted types of timing information). For example, a slew refers to the time required for a signal to change from one electrical state to another (e.g., the time required for a signal to rise from a logical low state to a logical high state). An example of a unit value for a slew value is picoseconds. Alternatively, the slew may be characterized by a plot of points defining the nature (e.g., a shape, a rise and a fall time) of the signal. Furthermore, a plurality of signals may be combined at any one or more inputs of a cell, each signal having unique timing information which may include one or more timing parameters. The slew of the signal is the amount of time it takes the signal to transition from a first logical state to a second logical state. The delay in the signal is the change in the time when a timing event, such as a transition of the logic state occurs. Delta delay is the change in the delay (resulting in a change in the timing arrival window) due to an aggressor signal.

While each input of a cell (i.e., each arc through the cell) has particular timing information associated with it, in order to simplify the analysis and reduce the amount of memory required for the analysis, GBA merges the timing information associated with each input of the AND-gate 102 at the output of the AND-gate 102. Merging may mean that one set of timing information is used to represent the timing information associated with several paths, each associated with one of the inputs. In addition, each path may include timing information for several signals. For example, merging is performed by applying worst case timing information (e.g., a longest slew) at the output of the AND-gate 102 to represent the timing information of each input at the output of the gate. In another example, best case timing information (e.g., a shortest slew) is used as the merged timing information 112. In another example, the merged timing information 112 includes both the worst case and best case timing information for the group of inputs, thus providing a window indicating a range of timing information (e.g., slews) through the cell. It should be noted that the particular timing information associated with each input is itself a simplification representing a range of values for the timing information, since there are typically variations in the timing information from one particular integrated circuit to another due to process and environmental variations, such as variations in doping levels from one chip to another, and temperature variations during the fabrication process. For example, two integrated circuits fabricated to the same design may have timing information (e.g., slews) that vary due to process and environmental variations from one integrated circuit to the other.

This process of merging the timing information at the output of each cell continues through the entire design, resulting in a single set of timing information at the output of each cell, including the cell 120 at the end of the paths. The timing information from inputs 1 and 2 of the third AND-gate 114 are merged, by selecting the timing information associated with input 2 to represent all paths through the third AND-gate 114 at the third input to the next AND-gate 116. The three inputs to the AND-gate 116 are merged at the output and the timing information associated with the first input is selected to represent all of the timing information for each input. This timing information propagates through the remaining two inverters 118, 120.

In the design shown in FIG. 1, there is only one cell (i.e., the inverter 120) that is at the end of all of the paths of the design. However, in typical complex designs, different paths may end at several different such cells of the design.

Merging the timing information at the output of each cell results in greater uncertainty regarding the timing of signals through the design, since the merged information is based on the most pessimistic (e.g., worst case) timing information from all the paths.

In contrast, PBA is accurate, but very slow. In PBA, the timing information in each path is tracked through each cell and preserved, so that the timing through each path can be determined with less pessimism than is possible in the GBA analysis. However, tracking the timing information through each path requires a substantial amount of memory and takes far longer, since each path must be independently traversed in the course of the analysis.

Figure 2:
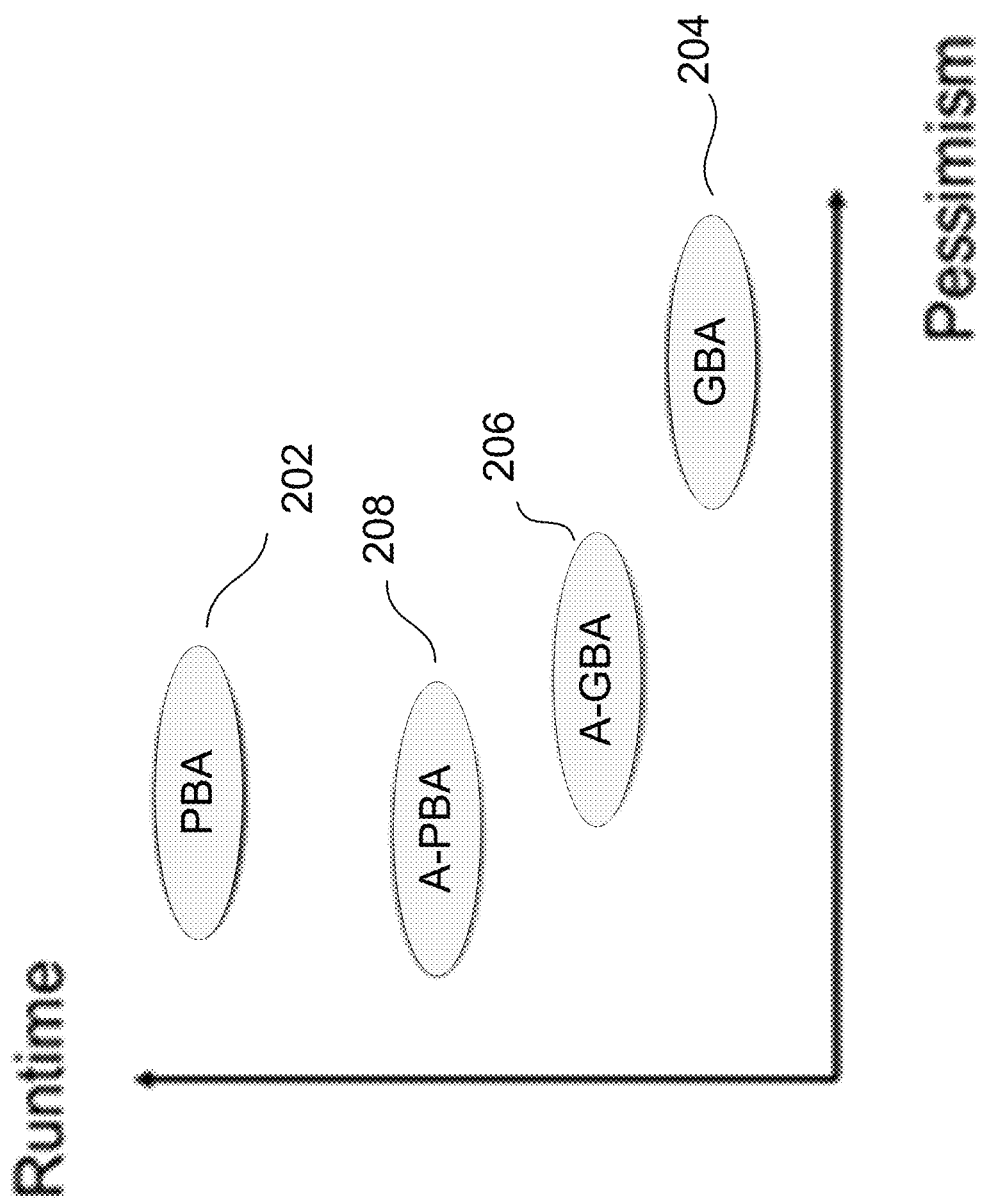
FIG. 2 illustrates a graph showing the relative runtime and pessimism of PBA and GBA verses advanced GBA (A-GBA) and advanced PBA (A-PBA), according to one embodiment.

FIG. 2 illustrates a graph showing the relative runtime and pessimism of PBA and GBA verses advanced GBA (A-GBA) and advanced PBA (A-PBA), according to one embodiment. A-PBA is a process that uses the output of the A-GBA to perform the final stage of the STA, as will be described in more detail below. Pessimism may refer to the amount of excess delay that is required to be attributed to the paths of the design when determining slack due to uncertainty.

Runtime refers to the amount of time required to perform the analysis. It should be noted that the amount of memory that is required is an additional parameter that typically essentially tracks runtime. That is, as runtime increases for each of these analysis techniques, so too does the amount of memory typically increase.

As shown in FIG. 2, PBA 202 has a relatively low level of pessimism, but a relatively long runtime. GBA 204, on the other hand, has a relatively short runtime, but results in a relatively pessimistic outcome. In contrast, A-GBA 206 has a runtime that is only slightly greater than GBA 204, but results in a significant reduction in pessimism. Accordingly, A-GBA 206 significantly reduces the pessimism of GBA 204 analysis to near PBA 202 levels with only a small increase in the runtime and the amount of memory required. This reduction in pessimism results in much less work being required by for an exhaustive A-PBA 208 to be completed, hence the runtime A-PBA 208 is improved compared to PBA 202. That is, due to the improvements in pessimism attained by A-GBA 206, A-PBA 208 has a significantly shorter runtime than PBA 202, and also results in a slightly less pessimistic outcome. One reason for this is the aggressor timing windows used in A-PBA 208 are narrower, as will be understood better as the description of these processes is provided in detail below. Accordingly, the outcome of the completed analysis has improvements in overall runtime, as well as in overall pessimism. A significant advantage of A-GBA 206 and A-PBA 208 is that like GBA 204 and PBA 202, A-GBA 206 results strictly bound A-PBA 208 results, making A-GBA 206 results fully qualified for sign-off activity.

Figure 3:
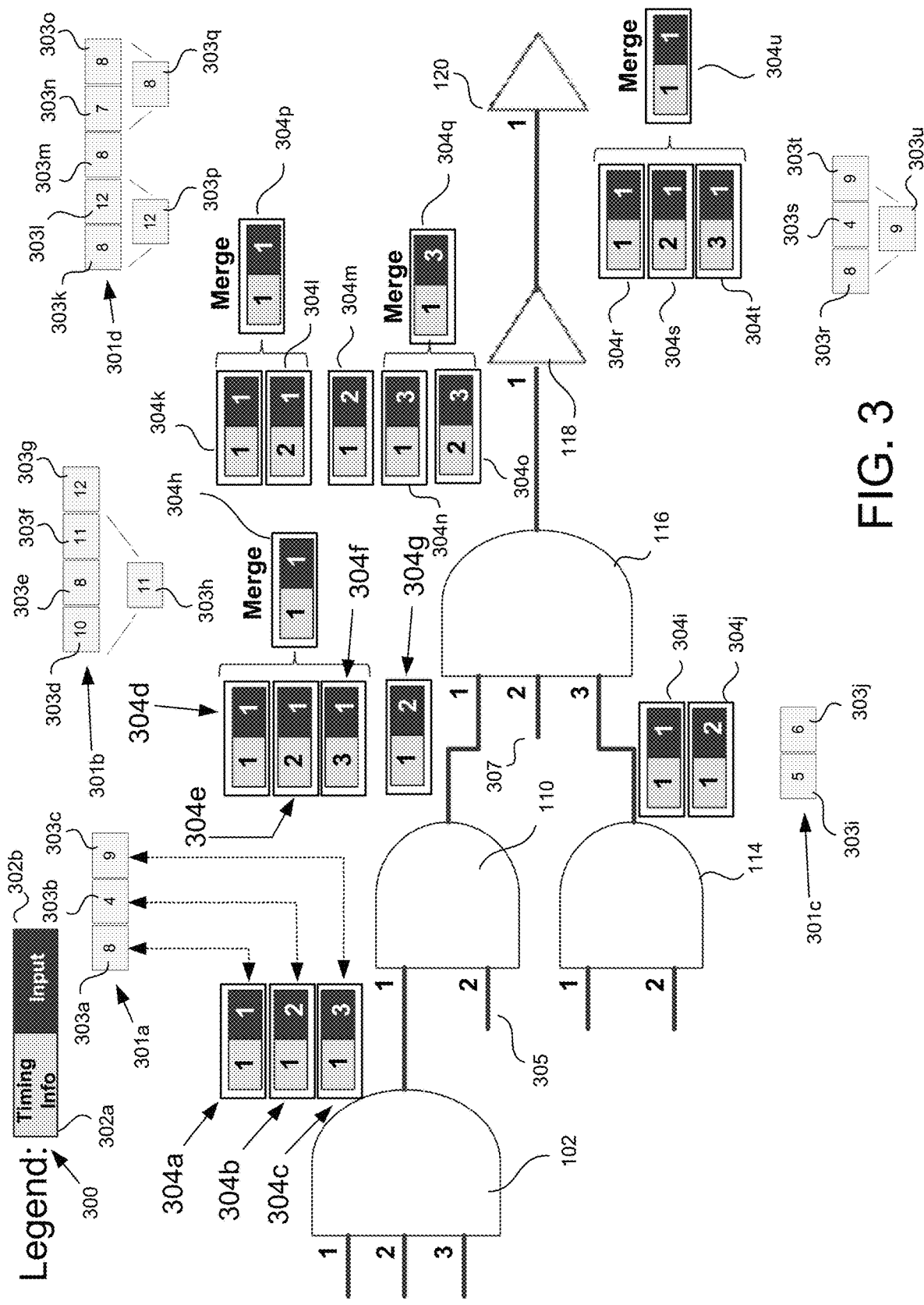
FIG. 3 illustrates an A-GBA process for the IC design as shown in FIG. 1, according to one embodiment.

FIG. 3 illustrates an A-GBA process for the IC design as shown in FIG. 1, according to one embodiment. The integrated circuit design of FIG. 3 is the same as the design shown in FIG. 1. That is, the configuration of cells that is under test is the same. However, the process by which timing information is tracked and merged is modified in accordance with embodiments of the presently disclosed method and apparatus for performing the STA on the design. In the case of an A-GBA process, merging of the timing information is delayed at least one cell with respect to the merging that is done in a GBA process Timing information is tracked using an indexing scheme that stores timing information in timing information vectors (TIVs) 301. The term vector refers to the fact that there may be several related elements 303 grouped together in one TIV 301.

It should be noted that throughout this disclosure, when reference labels used in the drawings have a numeric portion followed by an alphabetic portion, the numeric portion may be used alone to refer to any one or more of the items of the drawing associated a reference designation having the same numeric portion. For example, a reference to TIV 301 refers to any one or more of the TIVs 301a, 301b, 301c etc.

Initially, first timing information, such as slews, is received for each design input. In the design shown, there are seven such design inputs. In the examples shown, each design input receives only one signal and the timing information for that signal is shown as a single timing parameter. However, it should be understood that in some embodiments, more than one signal may be coupled to one or more of the design inputs, one or more of those signals having more than one timing parameter as part of the timing information that is tracked through that input.

The design inputs shown include the three inputs to the AND-gate 102, the second input 305 to the AND-gate 110, the two inputs to the AND-gate 114 and the second input 307 to the AND-gate 116. Timing information at the output of each cell is determined based on the timing characteristics of the cell and the received timing information applied to the design input (i.e., applied to the input of the cell). The timing characteristics of the cell are the aspects of the cell that create the resulting timing information when a signal propagates through the cell.

For each output of each cell of an integrated circuit (IC) design there is a corresponding TIV 301. Second timing information at the output of the cell is stored in the TIV 301. Each value associated with an element 303 of the TIV 301 represents the timing information, for example, a slew that has propagated from an input of the cell to the output of the same cell (e.g., AND-gate 102). Each element 303 of a TIV 301 is linked with a timing information key (TIK) 304. For example, the first TIK 304a is linked to the first element of the TIV 301a, as indicated by the dotted arrow between them. A TIK is a particular example of a timing information register (TIR) that carries (i.e., in which is stored) a value that indicates the origin of timing information stored in a linked memory location, such as a field of a TIV to which the TIK is linked. It should be noted that dotted arrows are only shown for the links between the TIKs 304a, 304b, 304c and the elements 303a, 303b, 303c of the TIV 301a at the output of the AND-gate 102. Such dotted arrows are not shown between the TIKs 304 and TIVs 301 at the outputs of the other cells, however, similar links exist between the TIVs 301 and TIKs 304 at the outputs of all the cells. The nature of the coupling between the elements 303 of the TIV 301 and the TIKs 304 may be by virtue of the TIKs 304 each being elements of a vector that parallels the TIV 301. Accordingly, the first element of the vector of TIKs (i.e., the first TIK 304a) is linked to the first element 303a of the TIV 301a, the second element of the vector of TIKs (i.e., the second TIK 304b) is linked to the second element 303b of the TIV 301b, etc. The TIK 304 maps the element 303 of the TIV 301 to a type of timing information (e.g., a slew) and an input. Nonetheless, for the sake of describing the disclosed method and apparatus, in the description provided herein with regard to several examples of embodiments of the presently disclosed method and apparatus, reference is made to the slew as the transition time from a first logical state to a second logical state.

FIG. 3 is an illustration of an example in which the first AND-gate 102 has three inputs. For example, a signal (or a simulated signal) having timing information, such as a slew in one example, is associated with each of the three inputs. In one embodiment of the disclosed method and apparatus, each of the three slews has a slew that represents the rate at which a signal applied to one of the inputs would transition. In one example of an IC design, the slew at the first input of the AND-gate 102 is 7 pS and produces a slew at the output of the AND-gate 102 of 8 pS. The slew at the second input of the AND-gate 102 is 5 pS and produces a slew at the output of the AND-gate 102 of 4 pS. The slew at the third input of the AND-gate 102 is 11 pS and produces a slew at the output of the AND-gate 102 of 9 pS. The slew values are received and stored in the TIVs 301. The contents of the TIVs 301 is not merged at the output of the cell, unlike the case in GBA. Rather, the timing information associated with each of the different inputs of the AND-gate 102 is maintained and the timing information associated with a particular input is uniquely indexed to allow tracking of the timing information through the design. In addition, in embodiments in which an input receives multiple signals, and the timing information includes one or more timing parameters for each signal, merging of any or all of the timing information may be delayed to allow tracking of each such parameter within the timing information to be independently tracked. In such embodiments, the TIVs 301 has one element for each timing parameter.

The particular timing information applied to each input of the AND-gate 102 depends on the source of the signal, and the loading of the signal imposed by the net arc for that path and the loading of the input of the AND-gate 102. In addition, other factors may impact the timing information making the timing information associated with each input of a cell unique. A net arc refers to the timing effects of connecting circuitry coupling a signal to a cell. Accordingly, independent of the cell arc (i.e., the timing effects of the cell from input to output) there is timing information (e.g., a slew) associated with a signal applied to a cell input. In the case of an input that is not coupled to a previous cell (i.e., inputs to the design), the source is a simulation. A TIV 301a associated with the output of the AND-gate 102 has three elements 303a, 303b, 303c, one for each timing information (e.g., slew) tracked to the output of the AND-gate 102. A first TIK 304a that is linked to the first element 303a of the TIV 301 maps the contents of the element 303a to the timing information is characterized by the value of the element 303a.

Each TIK 304 has a timing info field 302a and an input field 302b, as shown in the legend 300. The value of the timing info field 302a of the TIK 304a is "1" and the value of the input field 302b of the TIK 304a is "1". Accordingly, as indicated by the TIK 304a, the value "8" stored in the first element 303a of the TIV 301a is the slew of the first slew that propagated from the first input of the AND-gate 102 to the output of the AND-gate 102. It should be noted that there is only one slew that has propagated from the first input of the AND-gate 102 to the output of the AND-gate 102, as opposed to the output of the AND-gate 110, in which three different slews propagate to the output from its first input (i.e., one slew from each of the three inputs of the AND-gate 102). Since there is only one slew at each of the three inputs to the AND-gate 102, the slew value of all of the TIKs 304a, 304b, 304c is "1".

The TIK 304b is linked to the second element 303b of the TIV 301a. The value in the input field 302b of TIK 304b is "2", indicating that the value 4 pS stored in the second element 303b of the TIK 301a is the slew produced by the first slew propagating through the second input of the AND-gate 102 to the output of the AND-gate 102. The TIK 304c is linked to the third element 303c of the TIV 301a. The value in the input field 302b of TIK 304c is "3", indicating that the value 9 pS stored in the third element 303c of the TIK 301a is the slew produced by the first slew propagating through the third input of the AND-gate 102 to the output of the AND-gate 102.

In contrast with the GBA process that is described above with respect to FIG. 1, the timing information is not merged at the output of the AND-gate 102. Rather, timing information propagates to the output of the AND-gate 110. In this case, the three slews output from the AND-gate 102 have been determined by the slew at one of the inputs to the AND-gate 102 and the characteristics of the cell (i.e., the AND-gate 102) and coupled to the first input of the AND-gate 110. In addition, one slew propagates from the second input of the AND-gate 110 to the output of the AND-gate 110. Accordingly, the slews determined at the output of the AND-gate 102 are applied to the first input of an additional cell (i.e., AND-gate 110). Further timing information (e.g., a slew) is then determined based on the timing information determined at the output of the AND-gate 102 and the characteristics of the additional cell (i.e., AND-gate 110). Accordingly, the three slews applied to the first input of the AND-gate 110 taken together with the slew applied to the second input of the AND-gate 110 result in four slews at the output of the AND-gate 110. These four slews are stored in an additional TIV 301b at the output of the additional cell (i.e., AND-gate 110).

Accordingly, four additional TIKs 304d, 304e, 304f, 304g associated with the output of the AND-gate 110 are linked with a four element vector, TIV 301b that holds values that characterize the timing at the output of the AND-gate-gate 110. Accordingly, unique timing information is available for each of the four paths to the output of the AND-gate 110, including the three paths from the AND-gate 102 through the first input of the AND-gate 110 and the timing information associated with signals that come from the second input of the AND-gate 110.

The first of the three slews at the output of the AND-gate 102 has a slew of "8" (i.e., the slew stored in the first element 303a of the TIV 301a), which produces a slew of 10 pS at the output of the AND-gate 110. The slew of 10 pS is stored in the first element 303d of a four element vector, TIV 301b. A TIK 304d at the output of the AND-gate 110 is linked to the first element 303d of the TIV 301b. The input field 302b of the TIK 304d has a value of "1", indicating that the slew of 10 pS stored in the first element 303d of the TIV 301b propagated to the output of the AND-gate 110 through the first input of the AND-gate 110. The timing info field 302a of the TIK 304d has a value of "1", indicating that the slew of 10 pS is the first of the three slews that propagated through the first input of the AND-gate 110 to the output of the AND-gate 110. It should be noted that the value "1" in the timing info field 302a of the TIK 304d can also be used to point to the value stored in the first element 303a of the TIV 301a, which holds the first of the three slews coupled to the first input of the AND-gate 110. By having a link from the output of each cell to the outputs of each cell that provided an input, the timing information at each point in a path can be traced backwards and forward.

The second TIK 304e associated with the output of the AND-gate 110 has a value of "1" in the input field 302b and a value of "2" in the timing info field 302a, indicating that the element 303e of the TIV 301b to which this element is linked carries the timing information associated with the second slew that propagates through the first input to the output of the AND-gate 110. It can be seen from the previous TIV 301a that the second slew had a value of 4 pS. The slew of 4 pS coupled to the input of the AND-gate 110 produced a slew at the output of the AND-gate 110 of 8 pS, which is stored in the second element 303e of the TIV 301b, which is linked to the second TIK 304e.

The third TIK 304f associated with the output of the AND-gate 110 has a value of "1" in the input field 302b and a value of "3" in the timing info field 302a, indicating that the element 303f of the TIV 301b to which this element is linked carries the timing information associated with the third slew that propagates through the first input to the output of the AND-gate 110. It can be seen from the previous TIV 301a that the third slew had a value of 9 pS. The slew of 9 pS coupled to the input of the AND-gate 110 produced a slew at the output of the AND-gate 110 of 11 pS, which is stored in the third element 303f of the TIV 301b.

The fourth TIK 304g is linked to the fourth element 303g of the TIV 301b. The value in the input field 302b of the fourth TIK 304g is "2", indicating that the timing information stored in the fourth element 303g of the TIV 301b propagated to the output of the AND-gate 110 was produced by the propagation of a slew at the second input of the AND-gate 110. A slew of 2 pS at the input of the AND-gate 110 produces a slew of 12 pS at the output of the AND-gate 110. Accordingly, a value of 12 pS is stored in the fourth element 303g of the TIV 301b.

In the process illustrated in FIG. 3, the merging of the timing information is delayed by one level. Levels are defined such that each subsequent level is at the output of a corresponding subsequent cell along a signal path. Accordingly, cells delineate levels along a signal path. Therefore, while the timing information provided at the output of the first AND-gate 102 is not merged, each slew that is applied to the same input to the AND-gate 110 and propagates to the output of the AND-gate 110 is merged at the output. That is, the timing information stored in various elements of a TIV is merged upon the indexes linked to the various element indicating that the timing information has traversed a predetermined number of cells. In this example, there are three slews that all propagate to the output of the AND-gate 110 through one input (i.e., the first input), as indicated by the fact that the three TIKs 304d, 304e, 304f each carry the same value in the input field 302b. Since multiple slews from the same input are presented at the output of the AND-gate 110, each has propagated through at least one other cell (the AND-gate 102, in this case). In the example shown in FIG. 3, the fact that the timing information has traversed a predetermined number of cells (i.e., at least two cells) qualifies them to be merged.

A merge TIK 304h is then updated with a value of "1" in both the timing info field 302a and the input field 302b. The value of "1" in the timing info field 302a of the merge TIK 304h indicates that there is one merged slew representing the slew at the output of the AND-gate 110. In some embodiments, the maximum value from among the three slews 10 pS, 8 pS and 11 pS is selected as the merged slew. In such an embodiment, a value of 11 pS is stored in a merged element 303h. The merged element 303h represents the three elements (takes the place of) the three elements 303d, 303e, 303f. The output of the AND-gate 110 is coupled to the first input of the third AND-gate 116.

By delaying the merger of the timing information held in elements 303d, 303e, 303f of the TIVs 304b, the four unique paths to the output of the AND-gate 110 can be independently tracked to the output of the AND-gate 110. In addition, the particular variations in the timing of the signals that originated from the three different sources is preserved. That is, rather than having a single set of merge timing information that has a relatively broad range covering all three sources, each of the three sets of unique timing information have a range that is dependent only on the characteristics of the particular path associated with that set of timing information.

A two-input AND-gate 114 has two TIKs 304i, 304j associated with its output. The first TIK 304i is linked to a first element 303i of a TIV 301c associated with the output of the AND-gate 114. The second TIK 304j is linked to the second element 303j of the TIV 301c. Similar to the AND-gate 102, the inputs to the AND-gate 114 are also inputs to the design (i.e., they do not originate with another cell within the design) and so each have only one slew. Accordingly, the value "1" is carried in the timing info fields 302a of the TIKs 304i, 304j, indicating that the slews stored in the associated elements 303i, 303j are each the first (and only) slews that propagate through each of the respective inputs to the output of the AND-gate 114. The first TIK 304i has a value of "1" in the input field 302b, indicating that it is linked to a slew value that stored in the first element 303i of the TIV 301c associated with the output of the AND-gate 114. In this example, the slew at the first input to the AND-gate 114 is 4 pS, which produces a slew at the output of the AND-gate 114 of 5 pS. Accordingly, the value of 5 pS is stored in the element 303i that is linked to the TIK 304i. The slew at the second input is 7 pS, producing a slew of 6 pS at the output of the AND-gate 114. Accordingly, the value of 6 pS is stored in the element 303j that is linked to the TIK 304j.

The output of the AND-gate 114 is coupled to a third input of the AND-gate 116. The second input to the AND-gate 116 is also an input to the design (i.e., is not coupled to the output of another cell within the design). Five slews propagate to the output of the AND-gate 116: two from the first input of the AND-gate 116; one from the second input; and two from the third input. Accordingly, a vector, TIV 301*d* having five elements is associated with the output of the AND-gate 116.

The slew stored in the first element 303*k* of the TIV 301*d* is 8 pS (i.e., the result of the merged value of 11 pS propagating through the first input of the AND-gate 116 to the output). The slew stored in the second element 303*l* of the TIV 301*d* is 12 pS (i.e., the result of the slew of 12 pS propagating through the first input of the AND-gate 116 to the output). The slew stored in the third element 303*m* of the TIV 301*d* is 8 pS (i.e., the result of a slew of 9 pS propagating through the second input of the AND-gate 116 to the output). It should be noted that the second input to the AND-gate 116 is an input to the design. Therefore, in some embodiments, the value of the slew at the second input to the AND-gate 116 is derived from a simulation. The slew stored in the fourth element 303*n* of the TIV 301*d* is 7 pS (i.e., the product of the slew of 5 pS propagating through the third input of the AND-gate 116 to the output. The slew stored in the fifth element 303*o* of the TIV 301*d* is 8 pS (i.e., the product of the slew of 6 pS propagating through the third input of the AND-gate 116 to the output. The slews of the first two elements 303*k*, 303*l* are merged into element 303*p*, since they both propagated to the output of the AND-gate 116 through the same input (i.e., the first input). In parallel fashion, the TIKs 304*k*, 304*l* are merged into the TIK 304*p*. Similarly, the slews stored in the last two element 303*n*, 303*o* are merged into element 303*q*, since they also propagated through the same input (i.e., the third input) to the output of the AND-gate 116. In parallel fashion, the TIKs 304*n*, 304*o* are merged into the TIK 304*q*. That leaves three slews within three TIVs 303*r*, 303*s*, 303*t* associated with three TIKs 304*r*, 304*s*. 304*t* at the output of the inverter 118. The resulting slews are then merged at the output of the inverter 118 and stored in element 303*u*, since they all propagated to the output of the inverter from the same (and only) input. In parallel fashion, the TIKs 304*r*, 304*s*, 304*t* are merged into the TIK 304*u*.

By delaying the merging of the timing information in the timing path in A-GBA, the range of uncertainty in the timing information at each point in the analysis is reduced from that attained when the timing information is merged as in GBA.

Figure 4:
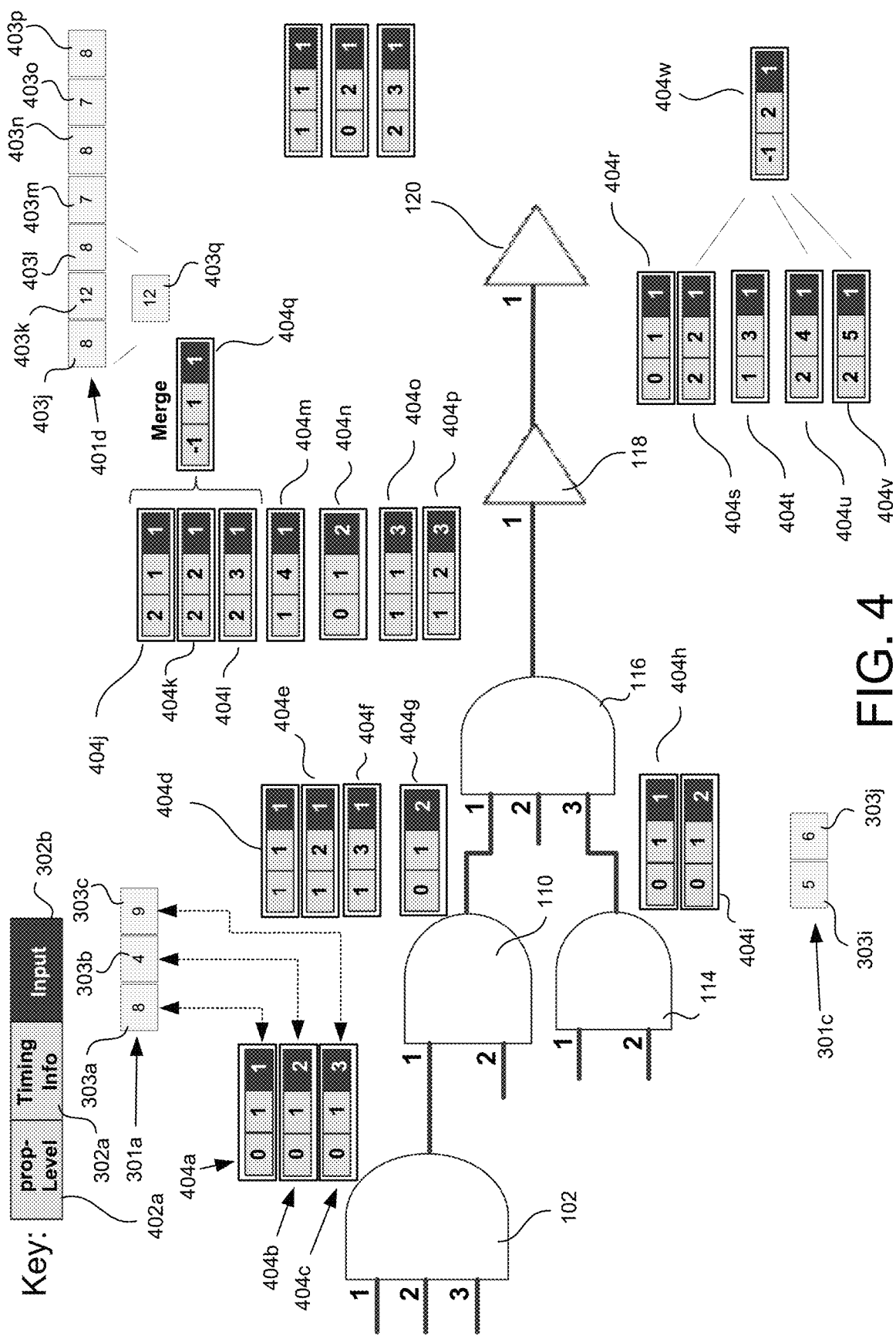
FIG. 4 illustrates the IC design as shown in FIG. 1 (i.e., same layout of AND-gates and inverters), but with an extended delay imposed on the merging of the timing information throughout the analysis, according to one embodiment.

FIG. 4 illustrates the IC design as shown in FIG. 1 (i.e., same layout of AND-gates and inverters), but with an extended delay imposed on the merging of the timing information throughout the analysis, according to one embodiment. That is, rather than delaying the merging of timing information by one cell, the merging of timing information is delayed by two cells (i.e., two "levels"; N=2). By extending the delay as shown and described below, the pessimism of the A-GBA process is further reduced from that of the analysis performed when the merging of the timing information is delayed by only one cell (i.e., N=1). However, the reduction in pessimism comes at the expense of longer run time and increased memory usage. It should be noted that the particular method for indexing the timing information stored at the output of each cell is merely one indexing scheme. Other indexing schemes are possible that would allow the timing information at previously traversed cells along a signal path to be maintained. The following description describes an indexing scheme that indexes the timing information held in each TIV at a plurality of points along a signal path to be associated with the point at which that timing information is relevant.

In the embodiment illustrated in FIG. 4, in which N=2, each TIK 404 has a propagation level field (prop-Level) 402*a*, the timing info field 302*a*, and the input field 302*b*. The value in the prop-Level field 402*a* indicates a number of levels through which the timing information has propagated. The initial input level (i.e., the level at the input to the IC design, such as at the inputs to the AND-gate 102, at input 2 of the AND-gate 110, at the inputs to the AND-gate 114 and at the second input to the AND-gate 116) is set to −1. At the output of each cell of the design through which the timing information propagates, the value of the prop-Level field increments by 1. The timing info field 302*a* and the input field 302*b* are similar as described with respect to FIG. 3.

Starting with the first AND-gate 102, there are three TIKs 404*a*, 404*b*, 404*c* at the output of the AND-gate 102, each associated with a corresponding slew from an input of the AND-gate 102, similar to that shown in FIG. 3. Similar to the TIKs 304 discussed with regard to the process illustrated in FIG. 3, the input field 302*b* of each TIK 404 contains a value that indicates which of the three inputs of the AND-gate 102 was traversed by the timing information stored in an element 303 of a corresponding TIV 301. Also, similar to the process illustrated in FIG. 3, the timing info field 302*a* in each TIK 404 indicates which of the plurality of slews that has propagated through that input, is associated with the timing information held in the corresponding element of the TIV 401 to which the TIK 404 is linked.

For example, the first TIK 404*a* is linked to the first element of the TIV 301*a*, as indicated by the dotted arrow between them. It should be noted that dotted arrows are only shown for the relationships between the TIKs 404*a*, 404*b*, 404*c* and the elements 303*a*, 303*b*, 303*c* of the TIV 301*a* at the output of the AND-gate 102. Such dotted arrows are not shown between the TIKs 404 and TIVs 301 at the outputs of the other cells for the sake of avoiding clutter in the illustration. However, similar relationships exist between the TIVs 301 and TIKs 404 at the outputs of all the cells.

As noted above, the prop-Level field (not shown) at the input of the AND-gate 102 is set to −1. A TIK 404 associated with the input to the AND-gate 102 is not shown, but may be present in some embodiments. However, in other embodiments, the information associated with inputs that are directly coupled to the inputs of the IC design are not associated with a TIK 404. Nonetheless, a prop-Level value can be assumed to be "−1" at such inputs and increments by one to a value of "0" at the output of the first cell through which that timing information propagates. For example, each TIK 404*a*, 404*b*, 404*c* at the output of the AND-gate 102 has a prop-Level field 402*a* that has a value of "0". The first such TIK 404*a* has a timing info field 302*a* that has a value of "1" and an input field 302*b* that has a value of "1". The TIK 404*a* is linked to the first element 303*a* of the TIV 301*a*. The TIK 404*a* indicates that the timing information stored in the first element 303*a* of the TIV 301*a* is associated with the first (and only) slew that propagates through the first input of the AND-gate 102 to the output of the AND-gate 102.

In the example illustrate in FIG. 4, similar to the example illustrated in FIG. 3, the timing information being tracked through the design is the values of slews associated with the outputs of each cell of the design. In this example, a slew of 7 pS is applied to the first input of the AND-gate 102 and results in a slew at the output of the AND-gate 102 of 8 pS, similar to the example illustrated in FIG. 3. The other two elements of the TIV 301 similarly have values that reflect the slews resulting from the slews at the other two inputs of the AND-gate 102, like the example illustrated in FIG. 3.

Four TIKs 404*d*, 404*e*, 404*f*, 404*g* are provided at the output of the AND-gate 110 that track the propagation of the timing information from the first input of the AND-gate 110 to the output of the AND-gate 110. The timing info field 302a and input field 302b of each of the TIKs 404d, 404e, 404f are the same as in the example illustrated in FIG. 3. The prop-Level field 402a in each of the TIKs 404d, 404e, 404f at the output of the AND-gate 110 are each incremented by one from the value of the prop-Level fields 402a at the previous level (i.e., in the TIKs 404a, 404b, 404c at the output of the AND-gate 102). Accordingly, each prop-Level fields 402a in the TIKs 404d, 404e, 404f carries a value of "1".

In addition, the timing info field 302a and the input field 302b of the TIK 404g have the same values as the timing info field 302a and the input field 302b of the TIKs 304g for the same reasons as noted above with respect to FIG. 3. In addition, the prop-Level field 402a of the TIK 404g is "0". That is, the value "2" in the input field 302b of the TIK 404g indicates that the slew stored in the element 303g of the TIV 301b is the slew that results from the slew that was applied to the second input of the AND-gate 110 and propagated through to the output of the AND-gate 110. Since the second input of the AND-gate 110 is directly from an input to the IC design (i.e., the input is not coupled to the output of any other cells in the IC design), the prop-Level at the input is "−1" and so increments to "0" at the output of the AND-gate 110.

The values of the fields 402a, 302a, 302b of the TIKs 404h, 404i at the output of the AND-gate 114 follow the same relationships as noted above. That is, the prop-Level fields 402a each have a value of "0", since they increment from the value "−1" at the inputs to the AND-gate 114. The timing info field 302 and the input field 302b in the TIK 404h indicate that the first TIK 404h and the associated element 303i in the TIV 301c are associated with the first slew that propagates through the first input to the AND-gate 114. The timing info field 302a and the input field 302b in the TIK 404i indicate that the second TIK 404i and the associated element 303j in the TIV 301c are associated with the first slew that propagates through the second input to the AND-gate 114.

It should be noted that in the embodiment illustrated in FIG. 3, the timing information that propagated through the first input to the output of the AND-gate 110 were merged at the output of the AND-gate 110. However, in the embodiment illustrated in FIG. 4, since the merging is done with N=2, and none of the prop-Level fields have a value of "2", no merging of the timing information occurs yet. That is, in the analysis illustrated in FIG. 4, rather than merging the timing information applied to the first input of the AND-gate 116 at the output of the AND-gate 110 (i.e., after tracking the timing through two cells), the timing of each of seven paths to the output of the AND-gate 116 is tracked (i.e., tracked through three cells).

It should be further noted that the TIVs 301b at the output of the AND-gate 110 is not shown in FIG. 4 for the sake of simplifying the illustration in FIG. 4, since it is identical to the TIV 301b shown in FIG. 3, with the exception of the fact that the values in elements 303d, 303e, 303g that are shown to be merged into an element 303h in FIG. 3 are not merged in the embodiment illustrated in FIG. 4.

It is only once the paths that flow through the first input of the AND-gate 116 reach the output of the AND-gate 116 that the timing information of three of those paths is merged. At that point, the prop-Level field 402a of three of the registers 404j, 404k, 404l have a value of "2", indicating that the timing information in each has been tracked through the predetermined number of cells. In the present example, the predetermined number of cells is three (i.e., the three AND-gates 102, 110, 116), as indicated by the prop-Level value of "2".

Therefore, the values stored in the elements 303j, 303k, 303l linked to those three TIKs 404j, 404k, 404l are merged. Upon merging the timing information at the output of the AND-gate 116, the timing information that has the greatest pessimism or the least pessimism (or both in the case in some embodiments) is used to represent the timing along all three of the possible paths from the first input of the AND-gate 110 to the output of the AND-gate 116 (i.e., the paths from the three inputs to the AND-gate 102 to the output of the AND-gate 116). In the example illustrated in FIG. 4, the values of the three elements 403j, 403k, 403l are "8", "12" and "8", respectively. Therefore, the three are merged into a single element 403q in which the value "12" (i.e., the maximum of the three values). That value is then stored in the merge TIK 404q. Correspondingly, the three TIKs 404j, 404k, 404l linked to the three elements 403j, 403k, 403l are merged into a single TIK 404q. The prop-Level field in the merge TIK 404q is set to −1 and the slew and input values are set to "1", indicating that the merged value is associated with the timing information for the first slew of the first input to the AND-gate 116. It should be noted that timing information can only be merged if the value of the input field in the TIKs of each has the same value. It should also be noted that the value in a prop-Level field can exceed the value of N if there are no candidates with which the timing information can merge. As soon as there are TIKs having the same value in the input field and values in their respective prop-Level fields 402a equal to or greater than other N, those value merge.

The merged value of 12 pS in the element 403q of the TIV 401d propagates through the inverter 118 to produce a slew of 10 pS at the output of the inverter 118. A first TIK 404r is linked to an element (not shown) of a TIV (not shown) that holds the value 10 pS. The prop-Level field 402a in the TIK 404r is incremented from the value −1 of the merged TIK 404q, to a value of "0". The timing info field 302a and the input field 302b indicate that the value of 10 pS is associated with the first slew propagating through the first (and only) input of the inverter 118. The second TIK 404s has a prop-Level of "2" derived by incrementing the prop-Level value of the second slew applied to the input of the inverter 118, which is associated with the TIK 404m.

It should be noted that while the TIK 404m was the fourth slew from the first input of the AND-gate 116, when that slew propagates through the inverter 118 it is the second of five slews that propagate through the inverter 118. Therefore, the timing info field 302a of the TIK 404s has a value of "2" and the input field 302b of the TIK 404s has a value of "1". The other two slews that propagate from the input to the output of the inverter 118 are associated with the TIKs 404t, 404u, each having a prop-Level field 402a with a value of "2" and an input field 302a with a value of "1". The timing info field 302a indicates that the TIK 404u is associated with the fourth slew and the TIK 404v is associated with the fifth slew that propagates through the inverter 118. Since there are three TIKs 404s, 404u, 404v that have the same value in their input field 302b (i.e., "1") and a value equal to "2" in their prop-Level field 302a, the timing information in the associated elements of the TIV (not shown) that are linked to those three TIKs 404s, 404u, 404v are merged and the TIKs are merged into a merge TIK 404w having the prop-Level field set to −1 (as occurs for all merge TIKs) and having a value of "2" in the timing info field 302a to indicate that the TIK is linked to an element in the TIV (not shown) at the output of the inverter 118 carrying the second slew that propagates from the input to the output of the inverter 118.

The TIV at the output of the inverter 118 is not shown for the sake of simplifying the illustration, since it is assumed that the previous description of the process makes clear the nature of the TIV and its elements. In addition, the timing information at the input of the last inverter 120 propagates to the output of that inverter 120 and be stored in each of the three elements of a three-element TIV (not shown) and that has associated TIKs (not shown) linked to each of the three elements of the TIV. The values in the input field 302*b* of each is "1", since each slew propagates through the first (and only) input for the inverter 120. The values in the respective timing info fields 302*a* are "1", "2", "3", respectively. The values in the prop-Level field are "1", "0" and "2", respectively.

Figure 5:
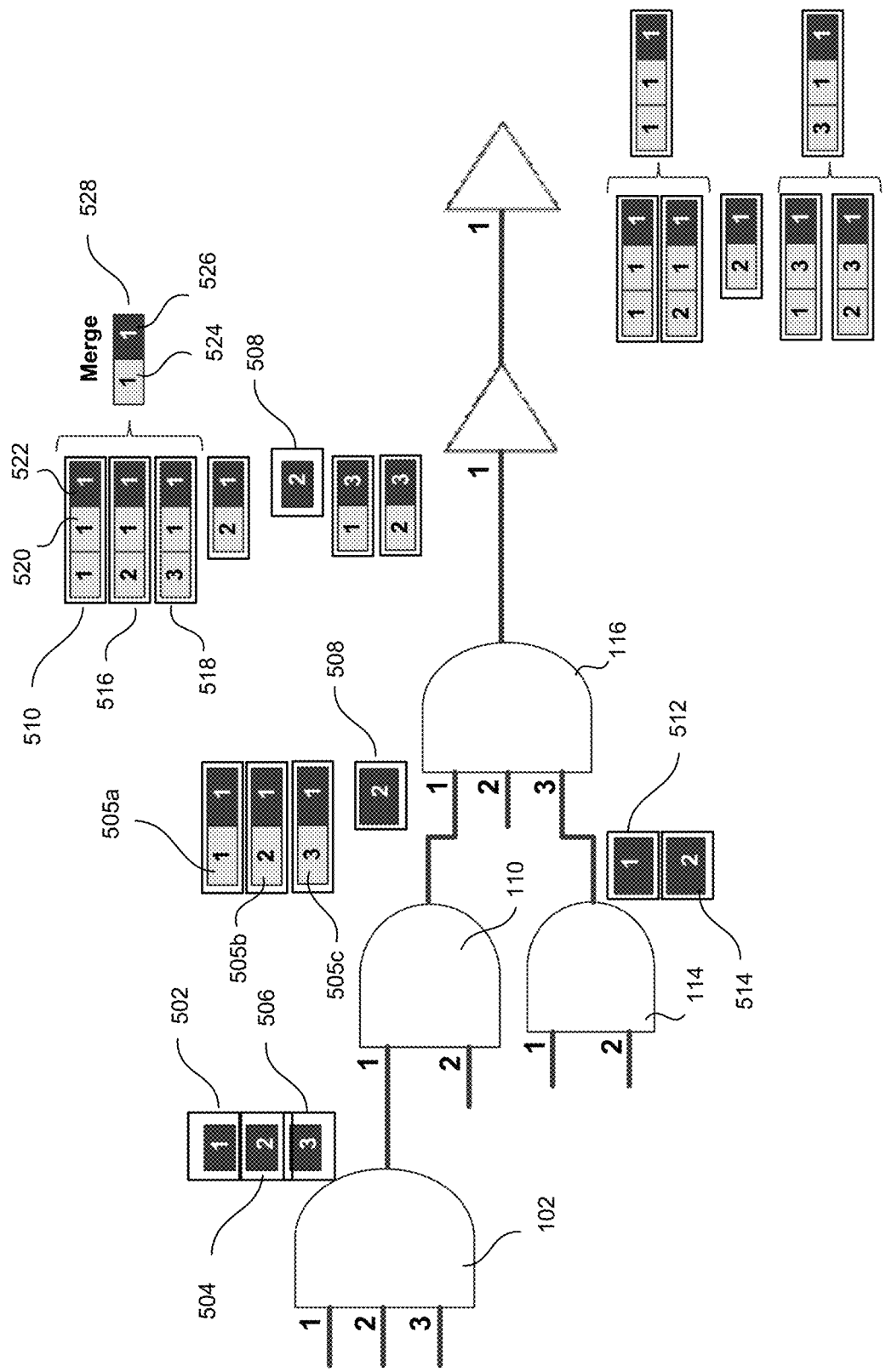
FIG. 5 illustrates the IC design as shown in FIG. 1, including a simplified indexing scheme in which only those index fields that are required to track the source of the timing information are used for each timing information register (TIR), according to one embodiment.

FIG. 5 illustrates the IC design as shown in FIG. 1, including a simplified indexing scheme in which only those index fields that are required to track the source of the timing information are used for each timing information register (TIR), according to one embodiment. For example, the inputs to the AND-gate 102 each only have one timing information (e.g., slew). Therefore, each index register 502, 504, 506 can use only one field to track the source of the timing information. Therefore, the index to an element of a TIV will only have three fields if the element of the TIV stores timing information that is associated with an output that has a path through at least three cells.

In the case of the inputs to a cell that are directly coupled to the design input, an index register having only one field can be used to indicate the source of the timing information. For example, the three inputs of the AND-gate 102 of FIG. 5 each have only one slew. At the next level (i.e., at the output of the AND-gate 110), a second field 505 distinguishes between the three slews that are coupled to the first input of the AND-gate 116. A fifth index register 508 has only one field (an input field) with a value of "2" indicating that this register 508 is associated with the slew from the second input of the AND-gate 110. Only one field is required in this register 508, since there is only one possible slew from the second input. Therefore, by identifying the second input in the input field, the slew is completely identified. Similarly, there is only one slew that can propagate through each of the two inputs to the AND-gate 114. Therefore, having two index registers 512, 514 that each have only one field is sufficient to completely characterize the source of the timing information at the output of the AND-gate 114.

There are seven possible slews that are propagated to the output of the AND-gate 116. Therefore, seven index registers are used, each with only the number of fields required to identify each slew associated with each input. For example, the first index register 510 has three fields. The first index register 510 is linked to the first element of a TIV (not shown) similar to the TIV 401*d* in FIG. 4. The first field is an input field carrying a value of "1" indicates that a first element of a seven-element TIV 401*d* has timing information stored therein that is related to a slew propagating from the first input of the AND-gate 116 to the output of the AND-gate 116. The second field has a value of "1" indicating that the associated timing information is also propagated through the first input of the AND-gate 110. The third field has a value of "1" indicating the timing information also propagated through the first input of the AND-gate 102. It should be noted that the three field index register 510 shown in the example illustrated in FIG. 5 differs from the TIKs of FIG. 3 and FIG. 4 in that there is no prop-Level field in the index register 510. Rather, each field indicates which input the slew flowed through to get to the output with which the index register is associated.

When the first two fields of two or more of the index registers carry the same value, the timing information associated with those index registers can be merged. For example, the three index registers 510, 516, 518 have the same value in the first two fields 520, 522, these three index registers 510, 516, 518 can be merged. Accordingly, the values of each of the slews that are carried within the fields of the TIV (not shown) associated with the index registers 510, 516, 518 are merged as well. Only the first two fields 524, 526 are preserved in a merge index register 528, since the distinction between the three slews that originated at the input to the AND-gate 110 is no longer present in the merged timing information presented at the output of the AND-gate 116.

In some embodiments, selection of the amount of information that is preserved through the analysis can be made based on the amount of pessimism desired and the tolerance for longer runtimes and greater memory usage. Therefore, this process can be extended to delay the merging for any number of cells. That is, the value N can be set as a function of the tradeoff between runtime and pessimism. The number of fields in the index registers will depend upon the number of inputs through which a slew can be tracked. If the value of N is 4, then a slew can be tracked through N cells (i.e., 4 cells). In such a case, the longest index register would have N+1=5 fields and index registers (and the associated slews) would be merged when the values in the last N=4 fields are the same. The resulting merged index register would maintain the value of those last N=4 fields in the N=4 fields of the resulting merged index register. For example, in the case shown in FIG. 5 in which N is equal 2, a slew can be tracked through N=2 cells (e.g., the AND-gates 116, 110). In such a case, the longest index register would have N+1=3 fields (such as the index registers 510, 516, 518) and index registers (and the associated slews) would be merged when the values in the last N=2 fields are the same. The resulting merged index register 528 would maintain the value of those last N=2 fields in the N=2 fields of the resulting merged index register 528.

Figure 6:
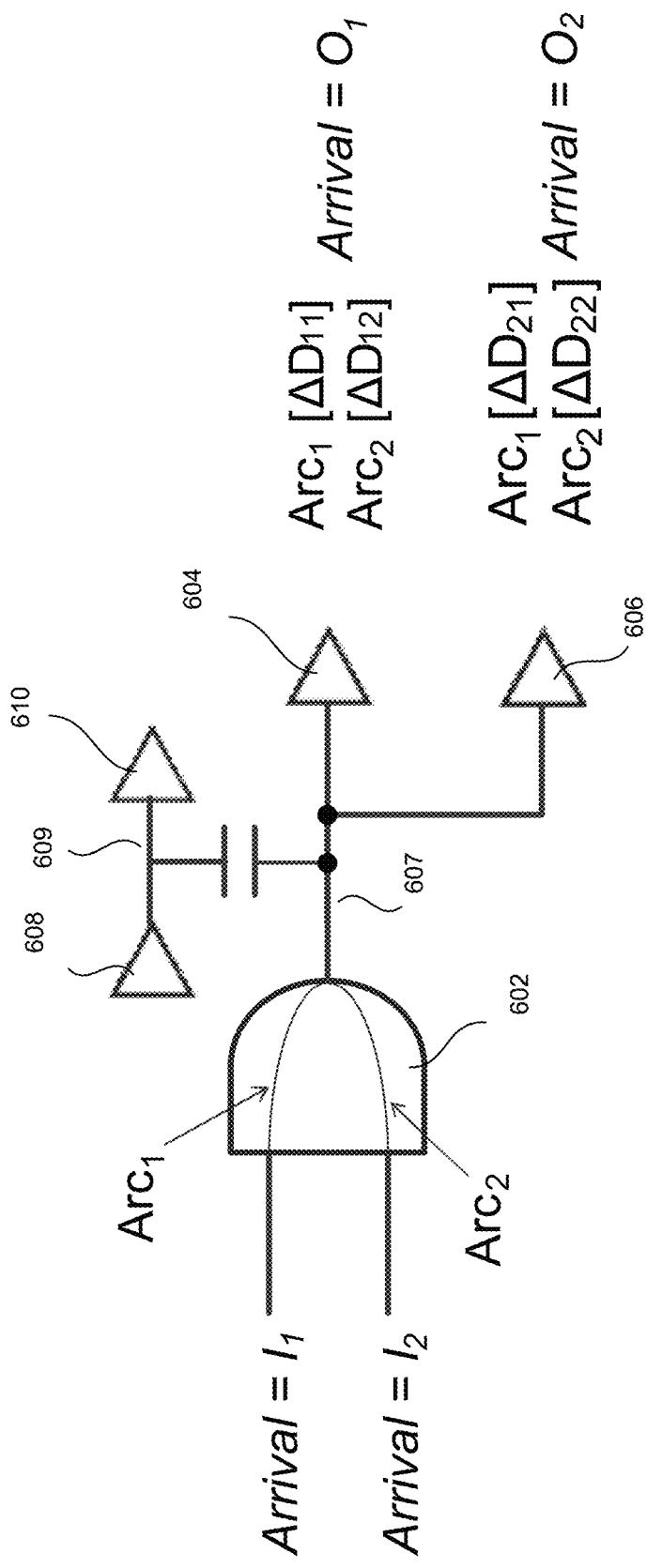
FIG. 6 illustrates an example circuit diagram that results in a reduction in pessimism, according to one embodiment.

FIG. 6 illustrates an example circuit diagram that results in a reduction in pessimism, according to one embodiment. A two-input AND-gate 602 is shown in which there is a timing arc ARC1, ARC2 between each of the inputs and the output. In addition, the output of the AND-gate 602 is coupled to two inverters 604, 606 along a path 607. In addition, there is another path 609 that is capacitively coupled to the path 607. That other path 609 connects two inverters 608, 610. The capacitive coupling between these two paths 607, 609 may occur due to the traces for the two paths running physically near one another. When a transition occurs for a signal on the first path 607 at a time that overlaps with the time at which a transition occurs on the second path 609, the capacitive coupling between the two paths can result in interference. Therefore, determining the arrival time of such transitions on the first path 607 with respect to the second path 609 is important to analyzing the impact of transitions on the second path 609.

The arrival of a signal (i.e., a transition from a first electrical state to a second electrical state) at the first input to the AND-gate 602 is "I1". In addition, the arrival of a transition at the second input to the AND-gate 602 is "I2". The arrival time "O1" at the output first inverter 604, and the arrival time "O2" at the output of the second inverter 606 can be determined as follows. The timing arc from each input to the output of the AND-gate 602 is designated at $ARC_1$ and $ARC_2$, respectively. The sum of $ARC_1$ plus the timing from the output of the AND-gate 602 to the output of the first inverter 604 for a signal applied to the first input of the AND-gate 602 is designated as $\Delta D_{11}$. The sum of $ARC_2$ plus the timing from the output of the AND-gate 602 to the output of the first inverter 604 for a signal applied to the second input of the AND-gate 602 is designated as $\Delta D_{12}$. The sum of $ARC_1$ plus the timing from the output of the AND-gate 602 to the output of the second inverter 606 for a signal applied to the first input of the AND-gate 602 is designated as $\Delta D_{21}$. The sum of $ARC_2$ plus the timing from the output of the AND-gate 602 to the output of the second inverter 606 for a signal applied to the second input of the AND-gate 602 is designated as $\Delta D_{22}$.

If the timing through the AND-gate 602 is merged at the output, then the arrival times $O_1$ and $O_2$ are determined to be:

$$O_1 = \text{Max}[(I_1 + \text{Max}[\Delta D_{11}, \Delta D_{12}]), (I_2 + \text{Max}[\Delta D_{11}, \Delta D_{12}])] \quad \text{EQ. 1}$$

$$O_2 = \text{Max}[(I_1 + \text{Max}[\Delta D_{21}, \Delta D_{22}]), (I_2 + \text{Max}[\Delta D_{21}, \Delta D_{22}])] \quad \text{EQ. 2}$$

Equation EQ. 1 shows that to calculate the arrival time at the output of the first inverter requires finding the maximum of two sums. The first is the sum of the arrival time $I_1$ at the first input of the AND-gate 602 and the maximum of the delay from either input of the AND-gate 602 to the output of the first inverter. The second sum is the sum of the arrival time $I_2$ at the second input of the AND-gate 602 with the maximum of the delays from either input of the AND-gate 602 to the output of the second inverter. EQ. 2 show a similar calculation for the arrival time at the output of the second inverter 606.

However, if the timing through the AND-gate 602 is not merged at the output of the AND-gate 602, then the arrival times $O_1$ and $O_2$ are determined to be:

$$O_1 = \text{Max}[(I_1 + \Delta D_{11}), (I_2 + \Delta D_{12})] \quad \text{EQ. 3}$$

$$O_2 = \text{Max}[(I_1 + \Delta D_{21}), (I_2 + \Delta D_{21})] \quad \text{EQ. 4}$$

It can be seen that the use of equations EQ. 3 and EQ. 4 will reduce the pessimism. For example, in the case in which $\Delta D_{11}$ is greater than $\Delta D_{12}$, but $12 + \Delta D_{12}$ is greater than $I_1 + \Delta D_{11}$, the result for $O_1$ in EQ. 1 would be $I_2 + \Delta D_{11}$, whereas the result for $O_1$ using EQ. 3 would be $I_2 + \Delta D_{12}$. Since $\Delta D_{11}$ is greater than $\Delta D_{12}$, it can be seen that the result for $O_1$ as determined by EQ. 1 will be more pessimistic (i.e., greater) then the result for $O_1$ as determined by EQ. 3. That means that the estimate for the amount of time that it takes a signal applied to the input of the AND-gate 602 to settle at the output of the inverter 604 will be greater when the timing information is merged at the output of the AND-gate 602, as opposed to when the timing information is preserved and merged at the next cell down the signal path. The increase in the amount of time that the signal can take to get to the output of the inventor 604 means that there is a greater chance that the signal on the path 609 will interfere with the signal on the path 607 (i.e., that the two signals will be transitioning at the same time).

Figure 7A:
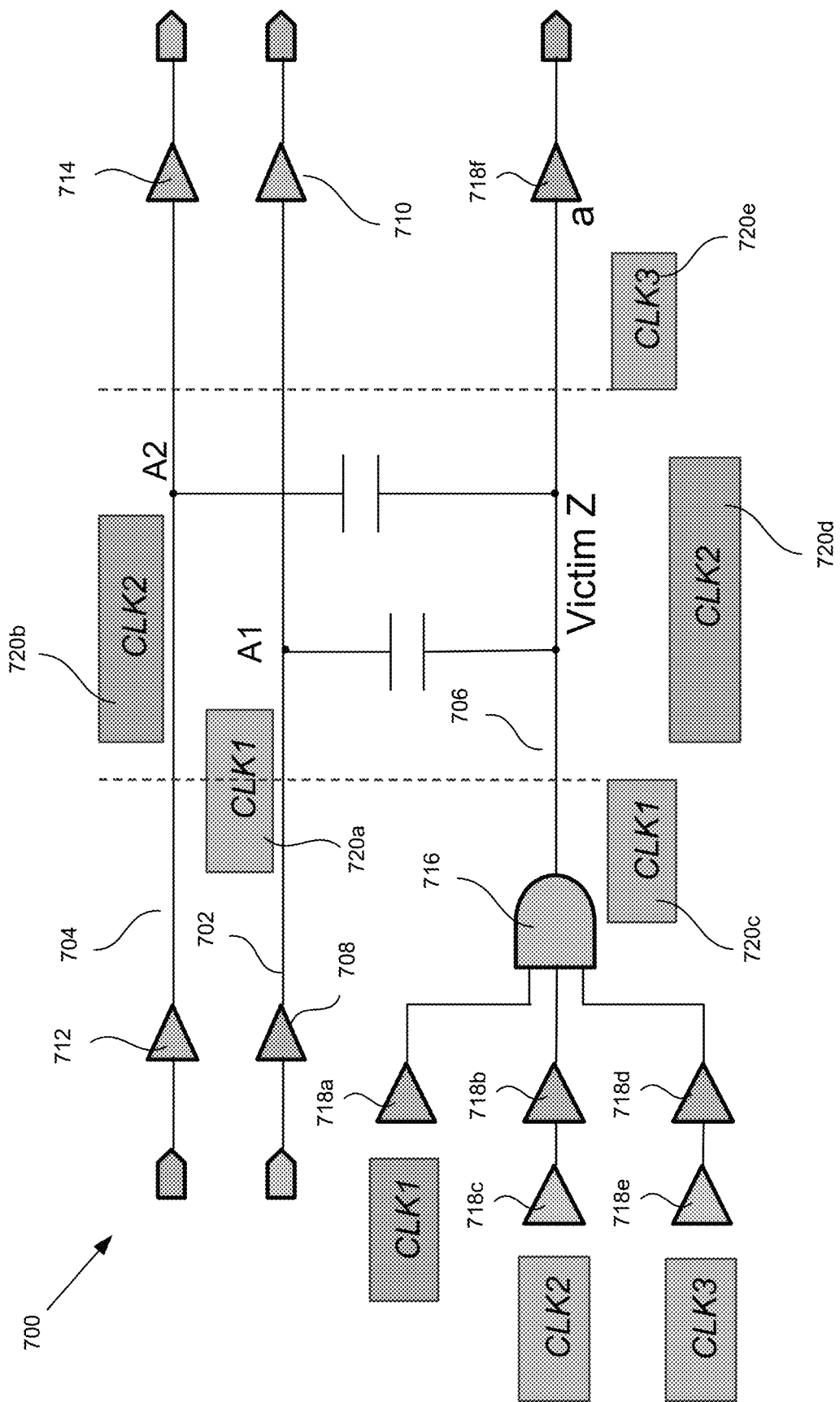
FIG. 7a illustrates clock aggressor overlap in an IC design, according to one embodiment.

FIG. 7a illustrates clock aggressor overlap in an IC design, according to one embodiment. Three paths 702, 704, 706 of an IC design 700 include a first path 702 (the first "aggressor" path) having a first inverter 708 coupled to a second inverter 710. A first clock signal CLK1 is applied to the input of the inverter 708. The second path 704 (the second aggressor path) also has a first inverter 712 coupled to a second inverter 714 and a second clock signal CLK2 coupled to the input of the first inverter 712. A third path 706 (the "victim" path) has a three-input AND-gate 716 coupled to six inverters 718. The first inverter 718a is coupled to a first input of the AND-gate 716 and has the clock signal CLK1 coupled to its input. The second inverter 718b is coupled to the second input of the AND-gate 716. The output of the third inverter 718c is coupled to the input of the second inverter 718b. The second clock signal CLK2 is coupled to the input of the third inverter 718c. The fourth inverter 718d is coupled to the third input of the AND-gate 716. The output of the fifth inverter 718e is coupled to the input of the fourth inverter 718d. A third clock signal CLK3 is applied to the input of the fifth inverter 718e. The output of the AND-gate 716 is coupled to the input of the sixth inverter 718f. Accordingly, it can be seen that the signal on the path 706 has transitions related to all three clocks CLK1, CLK2, and CLK3. Each clock has a timing arrival window 720. There are five such windows 720 shown. The first window 720a indicates the window of time during which CLK1 arrives at the output of the inverter 708. It should be noted that the particular point in the signal is arbitrary, but is the same relative point is the same for each of the signals under analysis. Typically, the point that is used to determine "delay" through a cell is around 50% point. For example, a delay is determined from a point in the input signal that is substantially halfway between the input signal's lowest voltage and highest voltage to a corresponding point in the output signal.

The timing arrival window indicates the window in time at which the reference point (e.g., the 50% point) in the clock signal arrives at a point in the circuit. The window opens at the earliest arrival time and closes at the latest arrival time. The earliest and latest arrival times may be determined based on a probability distribution, such that the arrival time for a desired percentage of the signals of the ICs to be tested falls within the window 720.

Similar to the paths 607, 609 discussed above with respect to FIG. 6, the first aggressor path 702 and second aggressor path 704 are each capacitively coupled to the victim path 706. Accordingly, an overlap of signals on the aggressor paths 702, 704 with signals on the victim path 706 will cause interference to the signals on the victim path 706. Such interference may alter the timing arrival window.

Figure 7B:
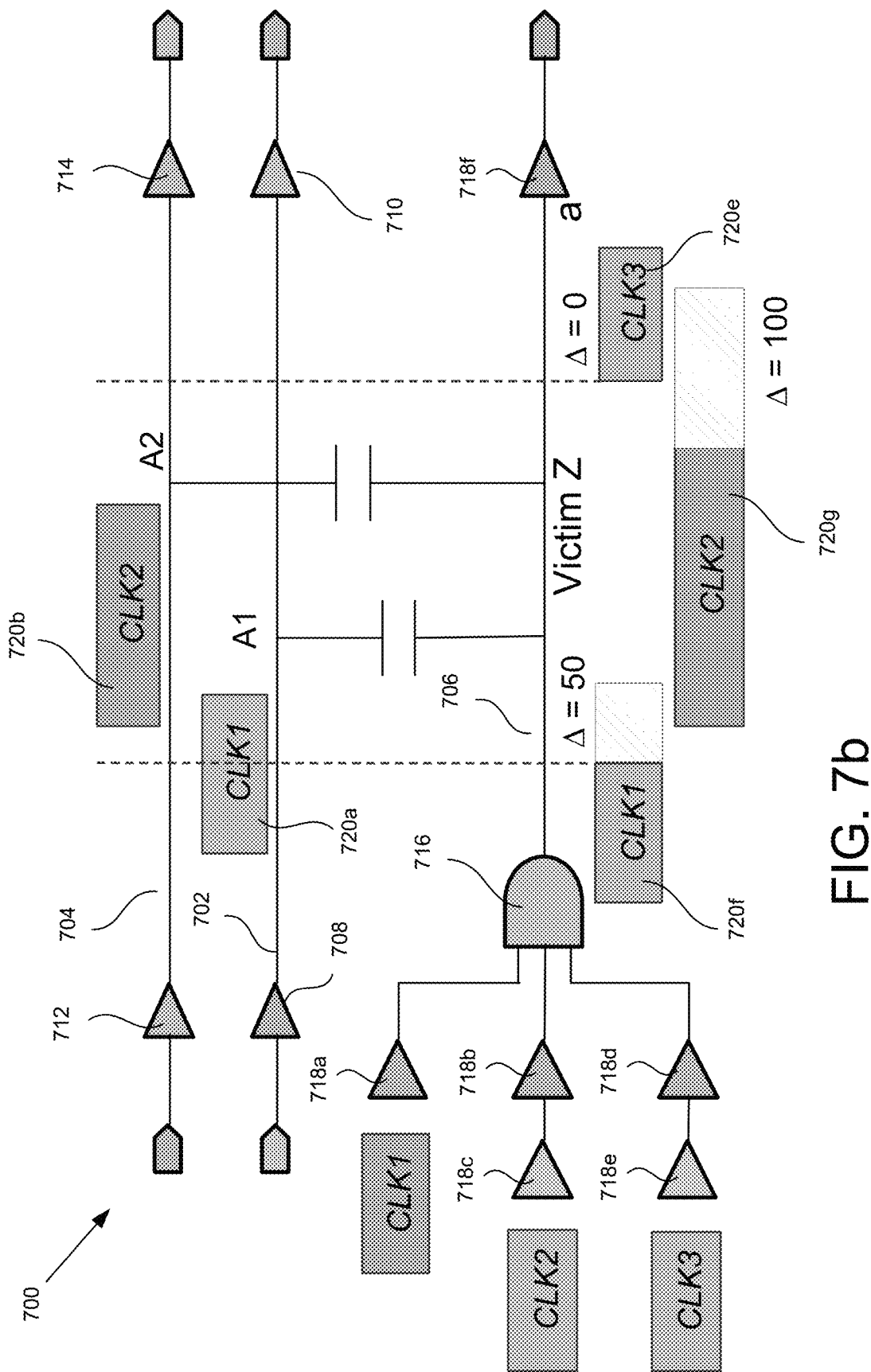
FIG. 7b illustrates clock aggressor overlap in the IC design of FIG. 7a, where timing arrival windows of some clocks have been altered by interference from the aggressor clock signals, according to one embodiment.

FIG. 7b illustrates clock aggressor overlap in the IC design of FIG. 7a, where timing arrival windows of some clocks have been altered by interference from the aggressor clock signals, according to one embodiment. The change in duration of a timing arrival window is called the delta delay. A positive delta delay causes the signal on the victim path 706 to arrive later in at least some cases, thus stretching the right side of the timing arrival window 720f by a delta delay of 50 units. In the case of the CLK2 signal, interference from the aggressor signals causes a delta delay of 100 units, thus stretching the right side of the timing arrival window 720g by 100 units (e.g., picoseconds in some cases). In contrast, the delta delay for the third clock CLK3 at the output of the AND-gate 716 is zero, since the timing arrival window 720e for CLK3 does not overlap with either of the timing arrival windows 720a, 720b of the aggressor clocks. It should be noted that, while not shown expressly in FIG. 7b, a negative delta delay will stretch the left side of the timing arrival window to the left, indicating that at least some of the signals will arrive earlier than they otherwise would without the effect of the aggressor signals.

The timing information at each point in the design may include a delta delay. In accordance with the presently disclosed analysis method and apparatus, postponing merging timing information such as the delta delays associated with each clock signal and thus tracking delta delays of the signals to the output of the AND-gate 716 reduces the pessimism by reducing the delta delay that is attributed to each clock signal. That is, CLK1 applied to the input of the AND-gate 716 will only have a delta delay of 50 units. In contrast, CLK2 will have a delta delay of 100 units and CLK3 will have delta delay of 0 units. Alternatively, if the delta delays of the three clocks are merged at the output of the AND-gate 716, the delta delay for each of the clocks CLK1, CLK2, CLK3 would be 100 units. Using analytical tools that merge the signals at the output of the AND-gate 716, the worst case is attributed to all three clock signals, making the outcome substantially more pessimistic. That is, the merged delta delay would be 100 for all of the signals at the output of the AND-gate 716.

TABLE 1

|  | Setup | | Hold | |
| --- | --- | --- | --- | --- |
|  | Average | Max | Average | Max |
| Arrival Improvement | 8.3 | 1608.5 | 3.4 | 1667 |
| Slack Improvement | 4.2 | 1510.5 | 0.5 | 722.6 |
| Endpoint Affected | 51.40% | 83.80% | 27.60% | 78.10% |

Table 1. shows that average setup arrival and slack in designs have improved by 8.3 ps and 4.2 ps respectively. Even more impressive is the maximum improvements which are 1608.5 ps and 1510 ps respectively. These statistics also show that an average of 51.4% of endpoints are affected by this innovation. Similar impressive results can be observed for hold analysis on these designs. Table 2 shows the runtime and memory cost of achieving this improvement. The average runtime and memory impact of A-GBA is 13.6% and 3.2% respectively.

TABLE 2

|  | Average | Max |
| --- | --- | --- |
| Runtime | 13.58% | 32.30% |
| Used Memory | 3.06% | 6.60% |
| Peak Memory | 3.23% | 7.60% |

In some cases, a single value for the arc between the first input of the AND-gate 102 and the output of the AND-gate 102 may be held in the element of a TIV associated with the path from input 1 of the AND-gate 102 to input 1 of the AND-gate 110. Alternatively, the element of the TIV may hold both the slew of the signal applied to input 1 of the AND-gate 102 and a separate slew value representing the slew of the signal arriving from input 1 of the AND-gate 102 at the input 1 of the AND-gate 110. In yet another embodiment, the timing information in the element of the TIV may be a complex set of data points characterizing a curve representing the slew of a signal at the output of the AND-gate 102 as the output signal moves from a first electrical state to a second electrical state. It will be clear to those skilled in the art that there are several possible timing parameters that might be used in the analysis and thus stored in the TIVs of the presently disclosed method and apparatus.

In some such cases, a composite (i.e., sum) of the delays to that point in the path from input 1 of the AND-gate 102 to the input of the AND-gate 110, including the slew of the signal at the input of the AND-gate 102, is stored in the associated element of the TIV at the output of the AND-gate 102. Alternatively, other related timing information used to characterize the timing of signals traversing the path between the input of the AND-gate 102 and the output of the AND-gate 102 can be stored in the associated element of the TIV. Alternatively, the timing information may include the delay from the input of the AND-gate 102 to the input of the AND-gate 110, without taking into account the slew at the input to the AND-gate 102, with the slew at the input of the AND-gate 102 being held separately in the TIV, where both pieces of timing information are indexed by the TIK or index register associated with the path at issue. While in some cases, only a composite value (e.g., the sum of the timing characteristics including the slew of the input signal at the input 1 of the AND-gate 102) need be stored, thus reducing the amount of information, and so reducing the amount of memory required, there may be implementations in which it is useful to maintain the delay from the input of the AND-gate 102 without the additional delay imposed by the slew of the signal applied to the input.

Figure 8:
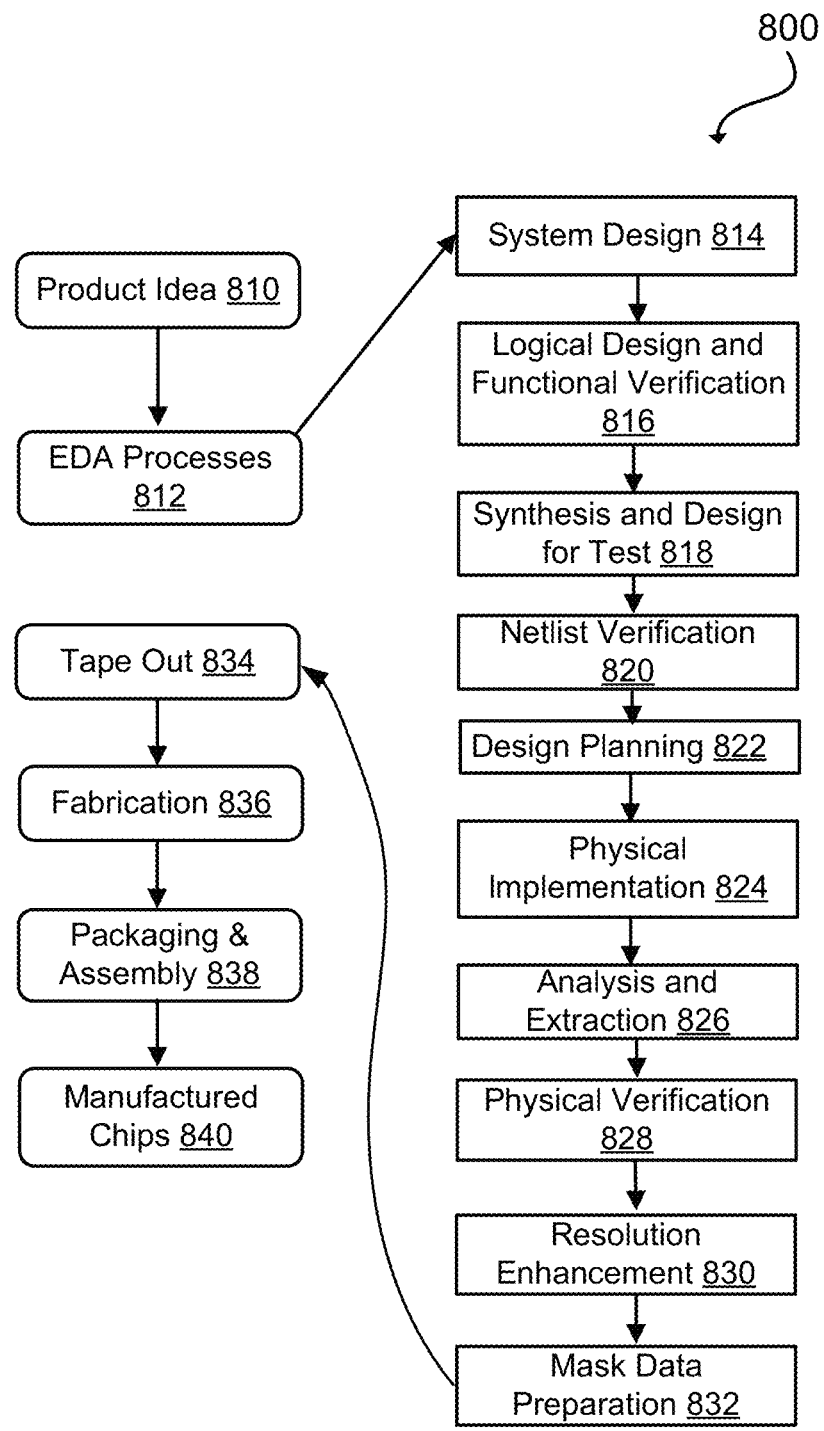
FIG. 8 depicts a flowchart of various processes used during the design and manufacture of an integrated circuit in accordance with some embodiments of the present disclosure.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 8. The processes described by be enabled by EDA products (or tools).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
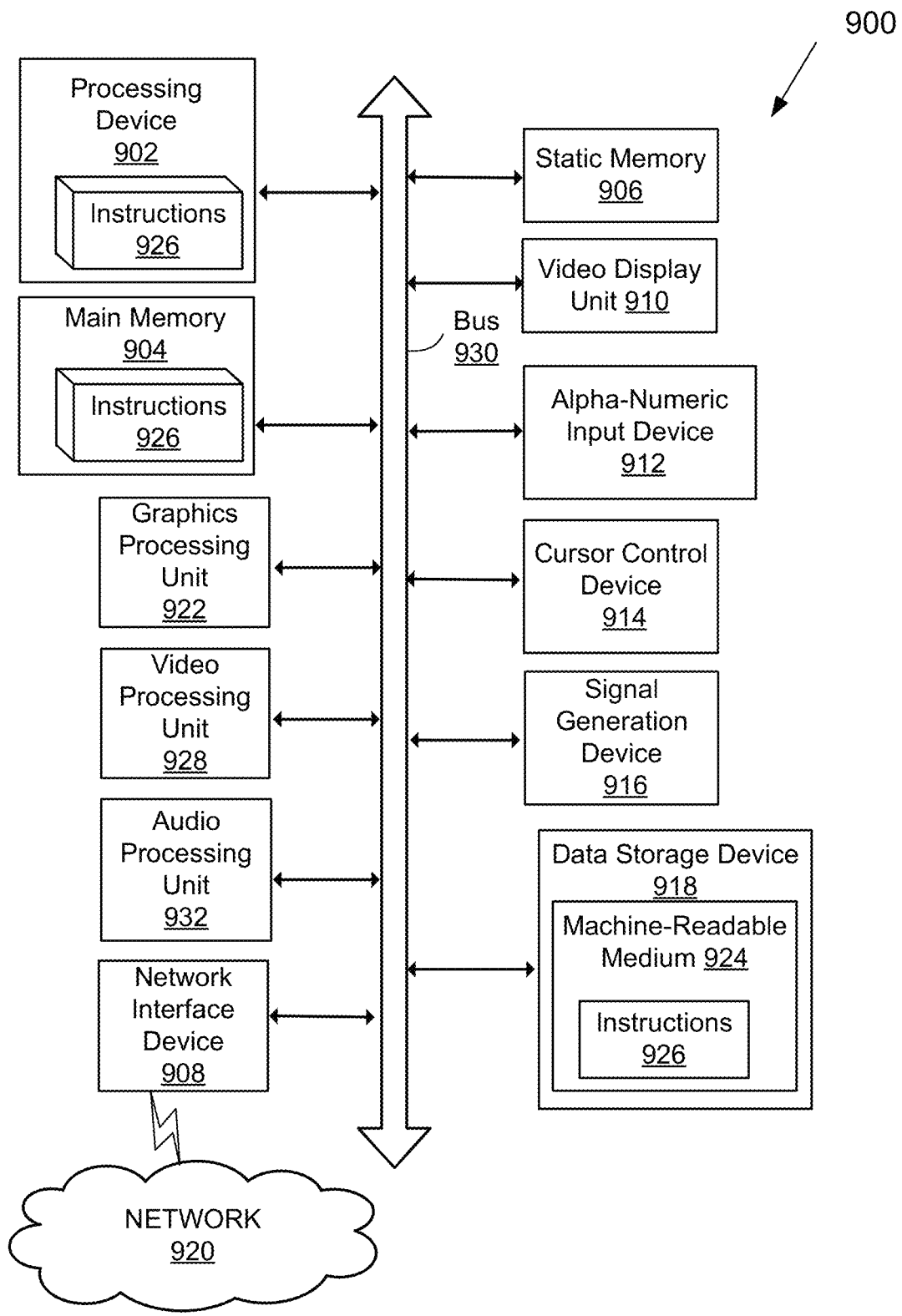
FIG. 9 depicts an abstract diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
receiving first timing information associated with signals applied to at least one input to a first cell within an integrated circuit (IC) design;
determining second timing information at an output of the first cell based on timing characteristics of the first cell and the first timing information;
storing at least a portion of the second timing information in an element of a first timing information vector (TIV);
providing a first index linked to the first TIV that identifies a path through a predetermined number of cells of the IC design traversed by the first timing information; and
merging a portion of the second timing information stored within a plurality of the elements of the first TIV upon the first index indicating that the portion of the second timing information within the plurality of elements has traversed a predetermined number of cells.

2. The method of claim 1, wherein the first timing information comprises first timing information for a plurality of signals, each of the plurality of signals associated with a corresponding input of the first cell.

3. The method of claim 2, wherein the portion of the second timing information that is stored in each element of the TIV is determined based on the first timing information for one of the plurality of signals and the timing characteristics of the first cell.

4. The method of claim 1, wherein:
the first timing information comprises timing parameters for a plurality of signals, each of the plurality of signals associated with a corresponding input of the first cell;
at least two signals, from among the plurality of signals, are associated with the same input of the first cell; and
the portion of the second timing information that is stored in each element of the TIV is determined based on the first timing information for one of the plurality of signals and the timing characteristics of the first cell.

5. The method of claim 4, wherein the timing information comprises at least one delta delay.

6. The method of claim 1, further comprising:
applying the second timing information to an input of a second cell to determine third timing information at an output of the second cell based on the second timing information and the timing characteristics of the second cell;
storing the third timing information in a second TIV; and
providing a second index linked to the second TIV, the second index identifying the path through the predetermined number of cells of the IC design traversed by the second timing information.

7. The method of claim 1, wherein the timing information includes at least one of a slew, a delay, a waveform, a clock, an effective capacitance, a worst arc index, and an internal data structure.

8. The method of claim 1, wherein at least one of the cells is a multi-input logic-gate.

9. The method of claim 1, wherein the predetermined number of cells is equal to 2 and the index has an information timing field and an input field.

10. The method of claim 1, wherein the predetermined number of cells is greater than 2 and the index comprises an information timing field, an input field and a propagation level (prop-Level) field.

11. The method of claim 10, wherein the input field indicates which input was used as the basis for determining the timing information stored in the element of the TIV linked to the index, the timing information field uniquely identifies the timing information and the prop-Level field indicates the number of cells through which the timing information has propagated.

12. The method of claim 1, wherein the predetermined number of cells is N, where N is greater than 2 and the index has a variable number of fields, the number of fields being based on the number of cells through which the timing information has propagated without having been merged.

13. A system comprising:
a plurality of timing information registers (TIRs) having elements for storing timing information, each TIR associated with an output of a cell within an integrated circuit design;
a plurality of index registers, each linked with an element of the plurality of TIRs and identifying an input of the cell and a timing information; and
a processor, coupled with the TIRs to:
receive timing information, each associated with a one of a plurality of inputs to a cell within an integrated circuit (IC) design;
store the timing information in the element of the TIR linked with the index register identifying the input with which the timing information is associated; and
track the source of the timing information for a predetermined number of cells using the index register; and
merge the timing information stored in the elements of a TIR upon the index register linked with the elements indicating that the timing information had been tracked through a predetermined number of cells.

14. The system of claim 13, wherein the timing information is the time required for a signal to change from one electrical state to another.

15. The system of claim 14, wherein the timing information is expressed in units of picoseconds.

16. The system of claim 14, wherein the timing information is characterized by a plot of points defining the nature of a signal.

17. The system of claim 13, wherein the timing information is a delay in a relative change of state of a signal.

18. The system of claim 13, wherein:
the first timing information comprises timing parameters for a plurality of signals, each of the plurality of signals associated with a corresponding input of a first cell;
at least two signals, from among the plurality of signals, are associated with the same input of the first cell; and
the portion of the second timing information that is stored in each element of the TIV TIR is determined based on the first timing information for one of the plurality of signals and the timing characteristics of the first cell.

19. The system of claim 18, wherein the timing information comprises at least one delta delay.

20. The system of claim 13, wherein at least one of the cells is a multi-input logic-gate.

21. The system of claim 13, wherein the predetermined number of cells is equal to 2 and the index register has a timing information field and an input field.

22. The system of claim 13, wherein the predetermined number of cells is greater than 2 and the index register further comprises a prop-Level field.

23. The system of claim 22, wherein an input field indicates which of the at least one inputs the received timing information was used as the basis for determining the timing information stored in the element of the TIV linked to the, TIR, and wherein a timing information field uniquely identifies a timing information and the prop-Level field indicates the number of cells through which the timing information has propagated.

24. A non-transitory computer readable medium comprising stored instructions, which when executed by a processor, causes the processor to:
receive timing information associated with signals applied to at least one input to at least one cell within an integrated circuit (IC) design;
determine timing information at an output of the at least one cell based on the timing characteristics of the at least one cell and the received timing information;
store the timing information in an element of a timing information vector (TIV);
provide an index linked to the TIV that identifies a path through a predetermined number of cells of the IC design traversed by the received timing information; and
merge the timing information within a plurality of the elements of the TIV upon the index indicating that the timing information within the plurality of elements has traversed a predetermined number of cells.

* * * * *